INVENTORS
JOHN Q. OWEN
COLIN BOWNESS
BY Robert T Dunn
AGENT

INVENTORS
JOHN Q. OWEN
COLIN BOWNESS
BY Robert T Dunn
AGENT

June 1, 1965　　　J. Q. OWEN ETAL　　　3,187,274
SQUARE WAVEGUIDE NONRECIPROCAL DIFFERENTIAL PHASE
SHIFTER WITH OPPOSITELY BIASED FERRITES
Filed Nov. 22, 1961　　　　　　　　　　3 Sheets-Sheet 3

INVENTORS
JOHN Q. OWEN
COLIN BOWNESS

BY *Robert T Dunn*
AGENT

3,187,274
SQUARE WAVEGUIDE NONRECIPROCAL DIFFERENTIAL PHASE SHIFTER WITH OPPOSITELY BIASED FERRITES
John Q. Owen, Natick, and Colin Bowness, Weston, Mass., assignors to Raytheon Company, Lexington, Mass., a corporation of Delaware
Filed Nov. 22, 1961, Ser. No. 154,225
2 Claims. (Cl. 333—1.1)

This invention relates generally to birefringent devices and more particularly to a birefringent waveguide for conducting waves which are polarized in different planes and are subject to nonreciprocal differential phase shift.

A birefringent transmission line or waveguide structure is one in which an initial wave is split into at least two components which travel at different velocities. In one type of nonreciprocal birefringent transmission line, such as described in United States Patent 2,850,701, filed August 7, 1953, and issued September 2, 1958, to A. G. Fox, the waves simultaneously travel over the same path but have electric fields oriented differently so that the waves interact differently with magnetized bodies of ferromagnetic material disposed in the path. The ferrite bodies not only delay both components different amounts so that they emerge from the guide at substantially different phases, but also cause transmission to be nonreciprocal for both components. Accordingly, the transmission line is useful as the nonreciprocal differential phase shift element in, for example, a circulator.

Birefringent nonreciprocal elements have also been employed in which a wave launched into one port is split into two waves which propagate along different paths. Ferromagnetic materials are disposed along both of the paths and magnetized so that the differential phase shift between the waves is nonreciprocal. Suitable hybrid structures are connected at opposite ends of the paths to form the ports of the circulator.

In the first type disclosed in the Fox patent, a section of circular waveguide is loaded with strips of ferrite material disposed against the inside walls of the guide and orientated substantially parallel to the axis thereof. The strips are located on the radial lines which are orthogonal, and different magnetic poles are applied to adjacent strips. As a result, an initial wave launched into the line is split into two dominant TE wave modes polarized transverse to each other. Both of these waves propagate along the same path in the same circular waveguide, but have electric fields substantially perpendicular or orthogonal to each other. Both waves interact with the magnetized ferrites; however, they experience different phase shifts which are nonreciprocal, and by careful adjustment of the magnetic fields and the length of the nonreciprocal paths and type of ferromagnetic material, the nonreciprocal differential shifts can be made suitable for use in a circulator. One disadvantage of this type of differential phase shift element is that both of the waves interact nonreciprocally with the magnetized ferrites, and the abovementioned adjustments must be made with this in mind. Furthermore, it is not possible to dispose the ferrites or launch the initial wave so that only one of the waves interacts with the magnetized ferrites. Accordingly, it is one object of the present invention to provide a nonreciprocal phase shift element in which at least two separate waves propagate along the same path and in which one wave interacts nonreciprocally with magnetized ferrites disposed along the path, whereas the other does not.

The other type of nonreciprocal phase shift element mentioned above includes two separate waveguides. An initial wave is split and one-half its power fed into each of the waveguides. Ferrite elements located in each of the waveguides are magnetized so that the split waves emerge out of phase. In the past, 3 db directional couplers located at each end of the nonreciprocal element complete the circulator. These couplers have of necessity been oriented in an unsymmetrical manner. For example, in one well-known circulator, magic T and sidewall types of 3 db directional couplers are connected to opposite ends of the nonreciprocal phase shift element and disposed with their ports projecting in different directions from the axis of the assembly. For many applications, this unsymmetrical orientation of the ports results in mechanical difficulties or inconvenience when connecting the circulator in a system. Accordingly, it is another object of the present invention to provide a differential phase shift type circulator with symmetrically disposed ports at opposite ends, thereby avoiding some of the inconveniences encountered in the use of prior devices.

In accordance with the present invention, a birefringent nonreciprocal wave transmission element is formed by a section of waveguide inherently capable of propagating at least two different waves at the same frequency having electric fields oriented in transverse directions. The section of waveguide is loaded with a plurality of strips of ferromagnetic material (for example, ferrites) generally disposed parallel to the axis of the waveguide and against the inside walls thereof. The ferrites are disposed and magnetized so that one of the waves interacts nonreciprocally with the magnetized ferrites, whereas the other wave does not. The structure is used advantageously as the differential phase shifting element of a circulator by coupling identical hybrid junctions to opposite ends thereof. The hybrid junctions each include an H-plane and an E-plane port and are disposed to form a completely symmetrical structure about at least two transverse planes through the center of the waveguide section.

In one embodiment of the present invention a section of square waveguide is loaded with ferrites attached to the inside of two of its opposing walls. The ferrites are preferably elongated strips and are oriented parallel to the axis of the waveguide and magnetized substantially perpendicular to the wall to which they are attached, the magnetizing fields through adjacent ferrites being oppositely directed. By this arrangement it has been found that waves propagating with an electric field parallel to the walls to which the ferrites are attached (transverse to the magnetizing field in the ferrites) will propagate in a reciprocal manner through the section of waveguide. On the toher hand, waves propagating with an electric field perpendicular to the walls to which the ferrites are attached (parallel to the magnetizing fields in the ferrites) will experience nonreciprocal attenuation or phase shift depending on the strength of the magnetizing fields. In another embodiment, a cruciform-shaped section of waveguide is loaded with the strips of ferrites which are magnetized in substantially the same manner so that, as a result, the waves propagating therethrough with electric fields parallel to the magnetizing field experience nonreciprocal insertion loss or phase shift, whereas waves propagating with electric fields perpendicular to the magnetizing field do not. Accordingly, in both of these embodiments, two separate waves polarized in transverse directions propagate along the same path along which there are disposed magnetized ferrites. Only one of the waves interacts nonreciprocally with the ferrites and incurs nonreciprocal insertion loss or phase shift. Propagation of the other wave through the section is completely reciprocal.

Either of the embodiments of the invention described briefly above may be employed with three-port hybrid structures connected at opposite ends forming a symmetrical structure in which the E-plane ports project from the axis thereof in the same direction, thereby facilitating use of the device and reducing mechanical problems ordinarily involved. Either of the embodiments may also be employed with a three-port hybrid coupled to one end, an antenna coupled to the other end, a transmitter coupled to one port of the hybrid and a receiver coupled to the other port of the hybrid to thereby form a complete transmit-receive system.

Other features and objects of the invention will be more apparent from the following specific description taken in conjunction with the drawings in which.

Figure 1A:
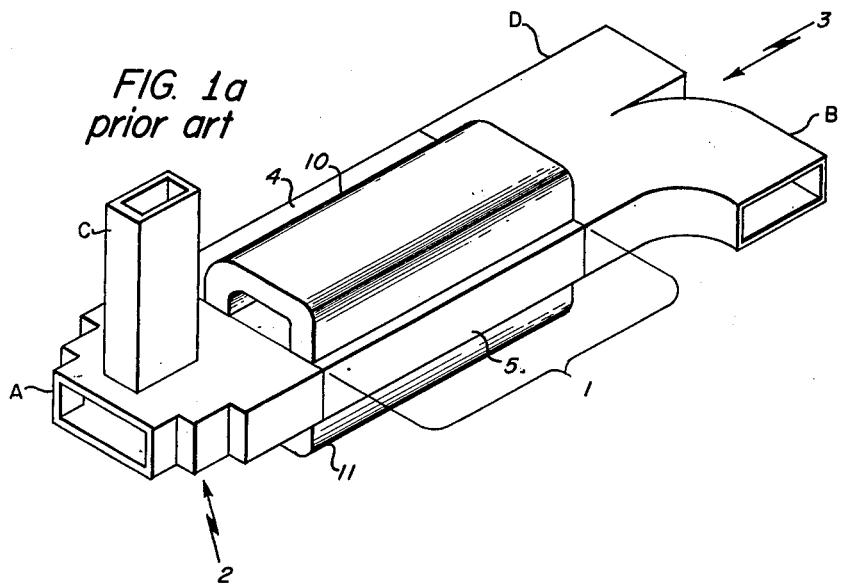
FIGS. 1a, 1b, 1c and 1d illustrate the prior art as an aid to understanding the present invention.
Figure 1B:
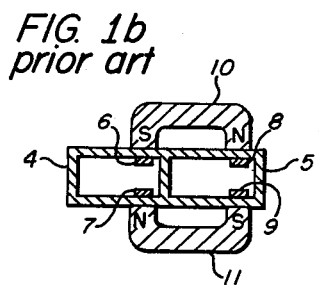

FIGS. 1a, 1b, 1c and 1d illustrate structures employed in the past to form a nonreciprocal phase shift type circulator employing a section or sections of waveguide loaded with magnetized ferrites to form the nonreciprocal phase shifter. FIG. 1a illustrates the complete four-port circulator including a nonreciprocal phase shifter 1 with different types of 3 db directional couplers coupled to opposite ends thereof. For example, at one end there is coupled a 3 db magic T hybrid structure 2, and at the other end there is coupled a 3 db wall coupling type hybrid structure 3. The four ports of the circulator are denoted A, B, C and D. Port A is an H-plane port of the magic T; port C is an E-plane port in the magic T and ports B and D are mutually uncoupled ports of the wall type coupler 3. The section of nonreciprocal phase shifter 1 is formed of two rectangular waveguides 4 and 5 disposed side by side and each loaded with elongated strips of ferromagnetic material disposed substantially parallel to the axes of the waveguides. FIG. 1b illustrates a sectional view of the differential phase shifter 1 showing the waveguides 4 and 5 and ferrites such as 6 and 7 loaded in waveguide 4, and 8 and 9 in waveguide 5. The ferrites 6–9 are subjected to substantially steady magnetic fields by magnets 10 and 11 so that waves will propagate nonreciprocally in both of the waveguides. However, the directions of magnetization in each of the waveguides are such that the phase shift differential therebetween is nonreciprocal. In other words, transmission through each of the waveguides 4 and 5 is nonreciprocal but in opposite directions. Operation of the circulator is illustrated schematically in FIG. 1c.

Figure 1C:
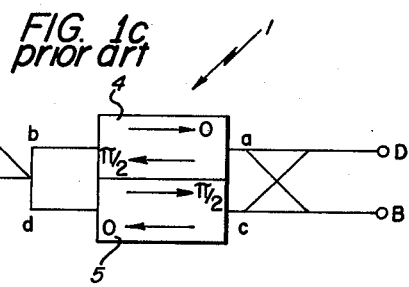

In FIG. 1c, each of the directional couplers 1 and 2 are illustrated by four terminals. The magic T directional coupler 2 is illustrated by terminals A, C, b, d, whereas the wall coupling hybrid 3 is illustrated by terminals B, D, a, c. Waveguide 4 couples terminals b and a, and waveguide 5 couples terminals d and c. The directions of phase shifts in these waveguides are as illustrated in the figure, and with this in mind, it becomes quite clear that the structure forms a circulator. In other words, waves launched at A emerge only at B; waves launched at B emerge only at C, and so forth.

Figure 1D:
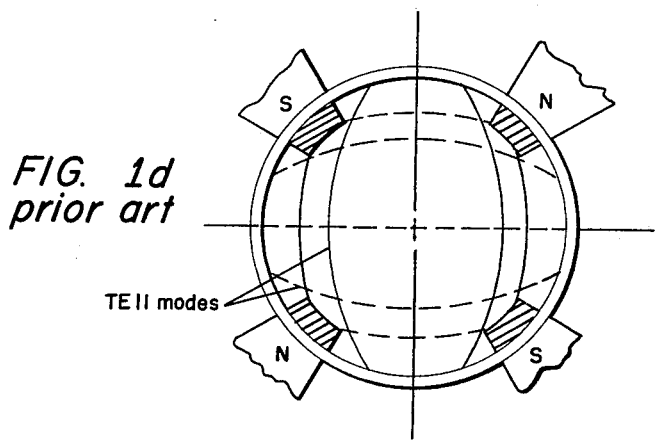

FIG. 1d illustrates a similar structure of a nonreciprocal differential phase shifter in which two separate waves transversely polarized propagate along the same path along which the magnetized ferrites are located. A nonreciprocal phase shifter such as this is illustrated in considerable detail in the above-mentioned Fox patent. The phase shifter illustrated in the Fox patent and in FIG. 1d is similar to that shown in FIG. 1b, insofar as both waves which propagate through the structure interact nonreciprocally with the magnetized ferrites. As a result, the well-known four-port circulators employing such a phase shifting structure have ports disposed unsymmetrically with respect to a transverse plane through the structure. Such a circulator is illustrated in the Fox patent and appears to be inherent when such a phase shifter is employed. The present invention avoids disadvantages which arise from such an unsymmetrical disposition of the ports.

Figure 2A:
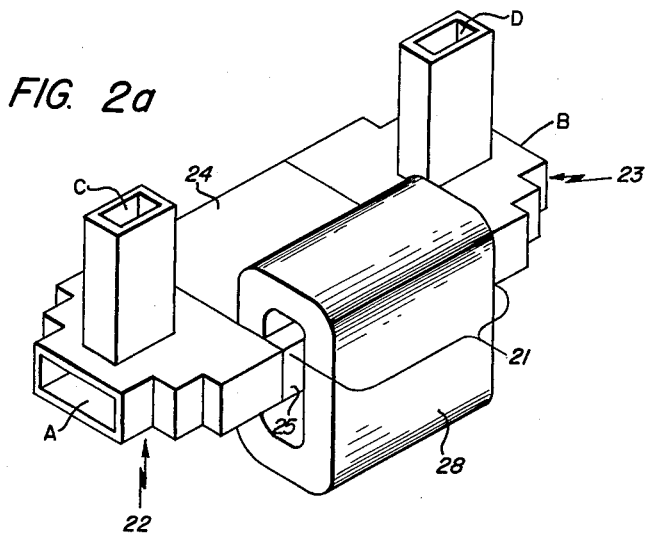
FIGS. 2a, 2b and 2c illustrate a four-port circulator incorporating features of the invention and forming a circulator with a symmetrical disposition of the ports, more particularly with E-plane ports projecting from the axis thereof in the same direction.
Figures 2B, 2C:
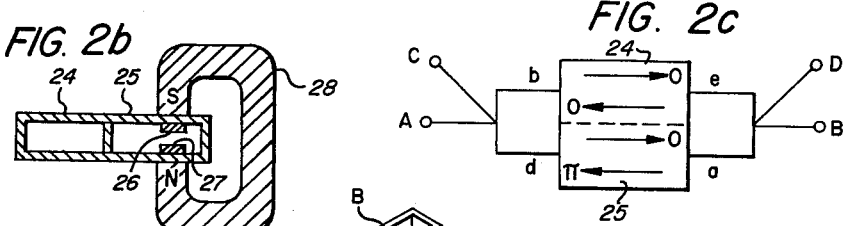

One feature of the present invention is illustrated in FIGS. 2a, 2b, and 2c. FIG. 2a illustrates a four-port circulator including a nonreciprocal differential phase shift element 21 with magic T type 3 db directional couplers connected to opposite ends thereof. The magic T couplers 22 and 23 are preferably identical and, as shown, are disposed symmetrically with respect to a plane passing transverse through the phase shift element 21. The four ports of the circulator are denoted A, B, C and D. Ports C and D are E-plane ports and A and B are H-plane ports. As shown in FIG. 2b, the phase shift element 21 is formed of two sections of waveguide 24 and 25, only one of which is loaded with magnetized ferrites. Accordingly, transmission through only one is nonreciprocal, and transmission through the other is reciprocal. For example, the ferrites 26 and 27 are loaded in waveguide 25 and magnetized by a permanent magnet 28 as shown.

FIG. 2c illustrates a schematic of the circulator shown in FIG. 2a in which the terminals A, B, b, d represent magic T 22 and in which terminals D, B, c, a represent magic T 23. Phase shifts through each of the guides 24 and 25 which form the differential phase shifter are as illustrated in the figure. Accordingly, it is clear that waves launched into port A appear only at B, waves launched into B appear only at C and so forth. One advantage of the circulator shown in FIG. 2a, as compared with the prior art in FIG. 1a, is that the ports A and C are symmetrically disposed with respect to the ports B and D. This arrangement of the ports has certain advantages insofar as the device can be readily connected to waveguides of a system and can be reversed in position without altering its operation. It is only necessary to reverse the poles of the magnet. Accordingly, the circulator in FIG. 2a can be disposed within a system with its magnet 28 jutting out to the right or to the left, which ever is most convenient from a mechanical standpoint. This is not possible with the structure shown in FIG. 1a or the circulator described in the Fox patent.

Figures 3, 4, 5:
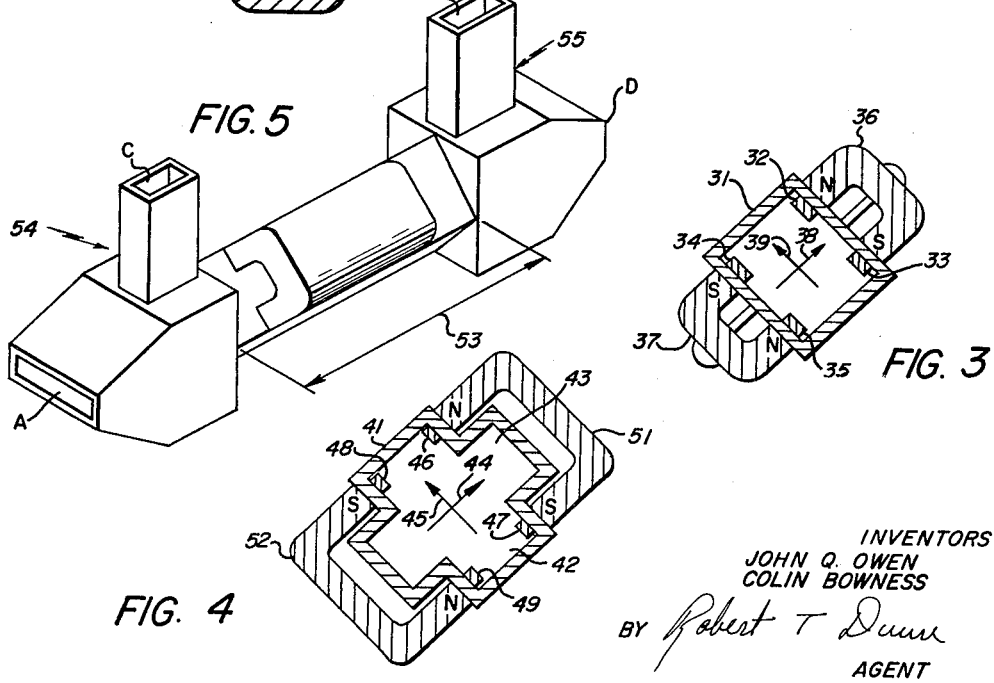
FIGS. 3 and 4 illustrate sectional views of birefringent differential phase shift elements incorporating features of the invention.
FIG. 5 illustrates a four-port circulator including a pair of identical three-port hybrid structures symmetrically disposed at opposite ends of birefringent differential phase shift elements such as illustrated in FIGS. 3 and 4.

FIG. 5 illustrates another circulator incorporating a nonreciprocal differential phase shifter constructed as shown in FIG. 3 or in FIG. 4. In FIG. 3, for example, the nonreciprocal differential phase shifter is formed by a section of square waveguide 31 loaded with elongated strips of ferrite material 32–35 disposed against the inside of opposing walls of the waveguide. The ferrite strips are magnetized as shown by permanent magnets 36 and 37 so that each ferrite is magnetized by a field which is substantially perpendicular to the wall to which it is attached. Furthermore, the directions of the magnetizing fields through adjacent ferrites are opposite. As a result, waves propagating through the waveguide 31 having an electric field aligned with arrow 38 will interact nonreciprocally with the magnetized ferrites and will thereby be subjected to nonreciprocal insertion loss or nonreciprocal phase shift. On the other hand, waves propagating in the waveguide with electric vectors aligned with arrow 39 will propagate therethrough reciprocally and will not be subject to any nonreciprocal phase shift or insertion loss. Accordingly, if a wave launched into one end of the phase shifter has an electric fiield which is not aligned with arrows 38 or 39, the launched wave will split into two components, one with an electric field aligned with arrow 38, and the other with an electric field aligned with arrow 39, and only one of these components will propagate therethrough nonreciprocally; propagation of the other one will be completely reciprocal.

FIG. 4 illustrates another structure of a nonreciprocal differential phase shifter incorporating features of the invention and includes a cruciform-shaped waveguide 41 which may be treated as two rectangular waveguides, the electric field of the fundamental mode is one being transverse to the electric field of the fundamental mode in the other. The two rectangular waveguides thus formed are denoted 42 and 43, and the directions of the electric vectors of fundamental modes in each are aligned with arrows 44 and 45 respectively. Strips of ferrite material 46–49 are disposed as shown in waveguide 42 and magnetized by permanent magnets 51 and 52 as shown. As a result, waves propagate nonreciprocally in rectangular waveguide 42, and waves propagate reciprocally in rectangular waveguide 43. Furthermore, if the electric field of a wave launched into one end of the structure forms an angle with both of vectors 44 and 45, then the launched wave will split into two components, one with an electric field aligned with vector 44 and the other with an electric field aligned with vector 45, which will propagate through waveguides 42 and 43, respectively.

Figure 6A:
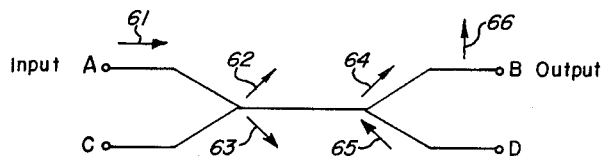
FIGS. 6a, 6b, 6c and 6d illustrate operation of the circulator shown in FIG. 3 in order to aid in understanding principles of operation.
Figure 6B:
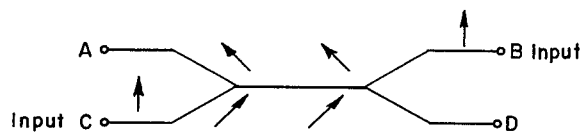
Figure 6C:
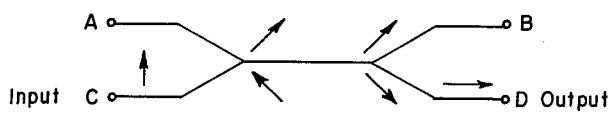
Figure 6D:
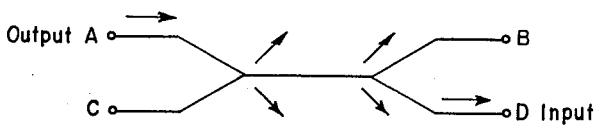

FIG. 5 illustrates a differential phase shift circulator employing either of the elements shown in FIG. 3 or 4 and denoted 53. Identical three-port hybrid structures 54 and 55 are coupled to opposite ends of the nonreciprocal differential phase shifter 53 forming the four ports of the circulator which are denoted A, B, C and D. Operation of this circulator is indicated schematically in FIGS. 6a, 6b, 6c and 6d which illustrate the course of waves launched into ports A, B, C and D, respectively. As shown in FIG. 5, the nonreciprocal phase shift element 53 is preferably positioned with respect to the three-port hybrid structures 54 and 55 so that waves launched into either end of the element are split into two components of equal amplitude with electric fields orthogonally disposed as illustrated by the arrows in FIG. 3 or FIG. 4. Furthermore, the ferrites in the element 53 are magnetized so that the differential phase shift of one of these components is 180° in one direction but zero in the opposite direction. Accordingly, as shown in FIG. 6a, a wave launched into H-plane port A with its electric field disposed as represented by arrow 61 enters the element 53 and splits into two components with electric fields oriented as represented by arrows 62 and 63. At the other end of the phase shifter the component represented by arrow 63 has been shifted 180° relative to the component represented by 62. Accordingly, these components represented by arrows 62 and 63 are represented at the other end of the phase shifter by arrows 64 and 65, respectively. Components 64 and 65 recombine at the other end of the phase shifter producing a single wave represented by arrow 66 which, by virture of its orientation, can emerge only from the E-plane port B. FIG. 6b illustrates in substantially the same manner the course of a wave launched into port B which splits into two components that experience no differential phase shift because they propagate through the element in a direction opposite to waves launched into terminal A. Similarly, FIGS. 6c and 6d illustrate the course of waves launched into ports C and D, respectively, thereby explaining operation of the circulator shown in FIG. 5.

Figure 7:
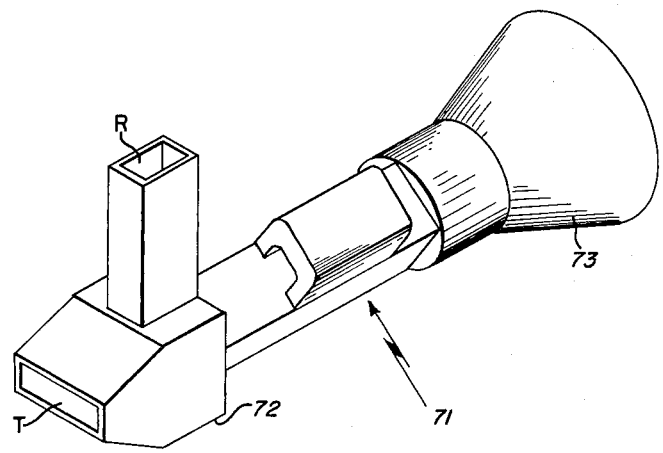
FIG. 7 illustrates another use of the elements illustrated in FIGS. 3 and 4 to form an antenna and transmit-receive system coupled thereto.

FIG. 7 illustrates another application of the invention including a nonreciprocal differential phase shifter 71 which may be constructed as shown in FIG. 3 or as shown in FIG. 4. A three-port hybrid junction 72 is coupled to one end of shifter 71, and a horn antenna 73 is coupled to the other end, thus forming a duplexer and antenna. In operation, port T is coupled to a transmitter, and port R is coupled to a receiver. The ferrites in phase shifter 71 are magnetized so that waves from the transmitter are launched into the differential phase shifter 71, split into orthogonally polarized components, both of which propagate through the differential phase shifter 71 without incurring any differential phase shift, and therefore recombine at the opposite end and energize the horn which radiates into space. Received radiation, on the other hand, also splits into two orthogonal components; however, one of these components experiences a 180° phase shift in phase shifter 71, and so the two components couple only to the R port and, thus, to the receiver.

The invention described herein consists briefly of a birefringent nonreciprocal differential phase shifter in which an initial wave is split into two components which travel along the same path through ferrite bodies disposed and magnetizsed so that transmission therethrough of only one of the components is nonreciprocal, transmission of the other component being reciprocal. The invention differs from prior systems and has advantages clearly set forth above. Furthermore, there is disclosed herein a number of different structures incorporating such a nonreciprocal phase shifter for accomplishing, for example, the purposes of a circulator or duplexer. However, it is to be clearly understood that these are made only by way of example and do not limit the spirit or scope of the invention as set forth in the accompanying claims.

What is claimed is:

1. A nonreciprocal differential phase shift device comprising:
    a single section of square waveguide;
    bodies of ferromagnetic material disposed along the inside of two opposing walls of said waveguide;
    fixed magnetic fluix field means magnetizing said bodies in directions substantially perpendicular to said opposing walls to interact in a nonreciprocal manner with a wave propagating therethrough, the direction of magnetization of opposing bodies being reversed in one-half of said waveguide with respect to the remaining half;
    plural E and H plane port hybrid input means launching waves into one end of said square waveguide polarized in directions forming substantial angles with all the walls of said waveguide;
    and plural E and H plane port hybrid output means at the other end of said waveguide conducting waves polarized substantially parallel to said launched wave, said input and output means being symmetrically disposed about at least two transverse planes through the center of said waveguide section.

2. A nonreciprocal differential phase shift device comprising:
    a single section of square waveguide;
    a plurality of bodies fo ferromagnetic material disposed along the inside of two opposing walls of said waveguide;
    fixed magnetic fluix field means magnetizing said bodies in directions substantially perpendicular to said opposing walls to interact in a nonreciprocal manner with a wave propagating therethrough, the direction of magnetization of opposing bodies being reversed in one-half of said waveguide section with respect to the remaining half;

plural E and H plane port hybrid input means launching waves into one end of said square waveguide polarized in a direction substantially parallel to the diagonals thereof;

and plural port output means at the other end of said waveguide conducting waves polarized substantially parallel to the diagonals of said square waveguide, said input and output E-plane ports being in symmetrically alignment at each end of said waveguide.

References Cited in the file of this patent

UNITED STATES PATENTS

| | | | |
|---|---|---|---|
| 2,849,684 | 8/58 | Miller | 333—1.1 |
| 2,849,685 | 8/58 | Weiss | 333—1.1 |
| 2,850,701 | 9/58 | Fox | 333—1.1 |
| 2,866,972 | 12/58 | Anderson | 333—24.1 |
| 2,948,863 | 8/60 | Honda | 333—10 |
| 2,961,617 | 11/60 | Stern | 333—24.1 |
| 3,036,278 | 5/62 | Chait | 333—1.1 |

HERMAN KARL SAALBACH, *Primary Examiner.*